G. Tingle.
Paddle Wheel
Nº 7,585.    Patented Aug. 20, 1850.
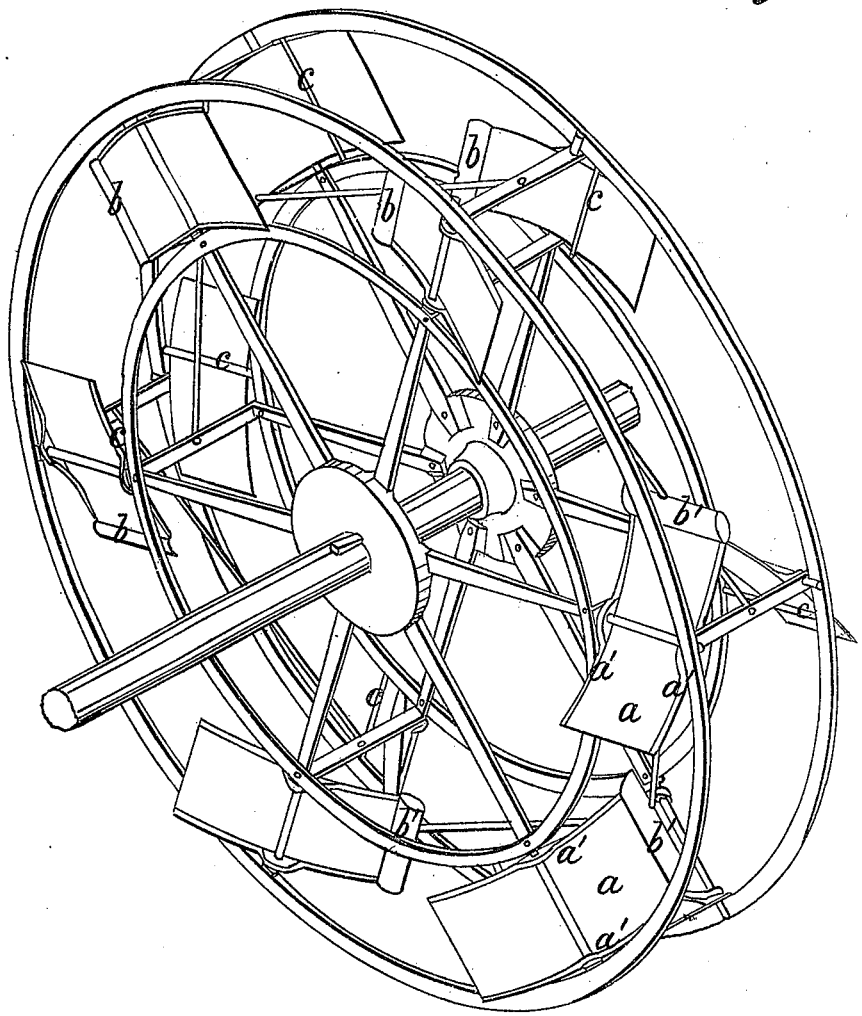

UNITED STATES PATENT OFFICE.

GEORGE TINGLE, OF NEW YORK, N. Y.

IMPROVED OPENING AND CLOSING BUCKET FOR PADDLE-WHEELS.

Specification forming part of Letters Patent No. 7,585, dated August 20, 1850.

*To all whom it may concern:*

Be it known that I, GEORGE TINGLE, of the city, county, and State of New York, have invented a new and useful Improvement in the Propelling-Wheels of Steamboats; and I do hereby declare the following to be a full, clear, and exact description of the same, reference being had to the annexed drawing, making a part of this specification.

The nature of my invention consists in certain improvements in the propelling-wheels for steam-vessels, the said improvements having for their object the production of a better action of the floats or buckets upon the water than the old modes, in order that the angular action of said floats may be measurably overcome and all jar, shocks, and undue commotion in the water be avoided, as well as that the ability to give a greater depth or immersion to the said floats may be obtained and thereby secure a greater hold upon the water.

I am aware that many attempts have been made to attain these results, some by causing the floats or buckets to move so as to maintain a vertical position while entering and leaving the water, these movements being obtained by the aid of eccentrics upon the supporting-shaft; but besides the consumption of power to operate said wheels, together with their complex construction, they were not practically found to produce much benefit in the way anticipated. Buckets have been also affixed permanently in various angular positions to the arms of the wheel, thus passing through the water in those fixed positions; and I am also aware that floats have been made to open and close in manner similar to mine, except as to the manner of performing those movements—viz., by the action of the water upon them—whereby the violence with which the closing movement was produced soon destroyed them. My invention differs from these plans in several respects, to be hereinafter described, while yet it produces the effects claimed for them without the disadvantages they labor under. In the first place, my floats are movable, but are not actuated by any force arbitrarily connected with the motive power, as is the case with all others, but take of themselves certain positions before entering the water best adapted to produce the greatest effects in propulsion.

I construct my wheel as follows: The frame is made as usual and affixed to the shaft by flanges, as shown. Between the rim and an inner band I attach the floats forming the buckets. These I propose to make of metal. They consist of broad plates stiffened on their sides by ribs, said plates being shown at $a$ and the ribs at $a'$, these ribs being thickened up at their centers. One edge of each of the plates $a$ terminates in a semicircular groove extending across its whole width, as seen at $b\ b'$, the object of which is twofold. The first is to give additional weight to that end in order to cause them to close together by gravity, and, secondly, it forms an edge curved inward to be presented toward the water when the wheel is reversed for the purpose of backing, and so cause those two edges to come together, and thus present the required surface for taking hold of the water. In the center of each plate and through each of the ribs $a'\ a$ a hole is made, the use of which is to suspend the several plates, as shown. The arms in the wheel are in two sets arranged equidistant from each other around the flange-plate, and the two sets are keyed to the bearing-shaft, so that each arm shall stand directly opposite to the other. The ends of each arm between the two brace-rings are turned to fit the holes in the rib $a'$. To each arm then a plate $a$ is affixed, as shown. Just in advance of the centers of each plate a stop $c$ is put, which consists of a rod secured to the two brace-rings, as represented. By reason of this stop the plates $a$ can revolve only partially in one direction on the arm of the wheel. The motion then which the plates have is one which will permit the two curved ends $b\ b'$ to come together, as shown at $b'$, and thus form an angular box, or to open so as to stand nearly parallel, as shown in the opposite side of the wheel. The plate likewise is not suspended on the arms exactly in the center of said plate, but so that the end opposite $b\ b'$ shall present somewhat the greatest surface.

The operation of the wheel is thus: The arrow represents the proper direction of the wheel to propel the vessel forward. As fast as each pair of plates $a$ arrive at the top of the wheel and pass the center of the shaft the ends $b$ begin to close together by reason of their superior weight being also slightly angled from the stop $c$, preventing them from standing at any time exactly parallel. Thus as they descend toward the water both edges finally join each other and butt together, as seen at b'. In this position they enter the water in the form of an angular box. The surfaces of the plates in front of the arms exposing the most surface to the water insures their keeping this position until they have partially left the water, when the plates are permitted to open and take the parallel position. This is effected the moment the forward ends of the plates rise above the surface, as then the pressure is taken off the front end and the water immediately forces the back ends apart. Thus they rise out without carrying any lift-water, and thereby cause no material disturbance in this place. Another advantage is the ability to immerse the wheel to a greater depth than the ordinary wheel and still avoid the bad effects produced by what would be the increased angular action in the old mode.

In order to back water the floats must come together from the opposite side of the wheel and from the bucket; but inasmuch as at that side the plates stand open by reason of the heavy edge being on the lower side of the axis some other method must be provided to accomplish this than by gravity. This is the object of the semi-cylindrical grooves b b', which in consequence of their edges curving inward cause the plates to close together by the angular action of the water against them, as clearly shown.

What I claim as of my own invention, and desire to secure by Letters Patent, is—

1. The formation of each of the blades composing the bucket so that their inner or closing ends shall be heavier than the outer ends thereof when combined with a stop or stops, substantially as herein described, thus effecting the closing together of the same by the action of gravity before entering the water, as set forth.

2. Curving the inner edges so as to insure the closing of said edges together by the action of the water while backing, and thus complete a sufficient bucket for that purpose, substantially in the manner described herein.

GEO. TINGLE.

Witnesses:
S. H. MAYNARD,
THOMAS H. WOOD.